United States Patent
Lee et al.

(10) Patent No.: US 11,371,397 B2
(45) Date of Patent: Jun. 28, 2022

(54) SYSTEM AND METHOD FOR CONTROLLING VARIABLE OIL PUMP

(71) Applicants: Hyundai Motor Company, Seoul (KR); Kia Motors Corporation, Seoul (KR)

(72) Inventors: Yonggyu Lee, Gyeonggi-do (KR); Ho Sung Nam, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 856 days.

(21) Appl. No.: 16/161,259

(22) Filed: Oct. 16, 2018

(65) Prior Publication Data

US 2019/0170031 A1 Jun. 6, 2019

(30) Foreign Application Priority Data

Dec. 5, 2017 (KR) .................. 10-2017-0165921

(51) Int. Cl.
*F01M 1/16* (2006.01)
*F01M 1/02* (2006.01)
*F16N 13/20* (2006.01)

(52) U.S. Cl.
CPC ............... *F01M 1/16* (2013.01); *F01M 1/02* (2013.01); *F16N 13/20* (2013.01); *F01M 2001/0238* (2013.01); *F01M 2001/0246* (2013.01); *F16N 2210/04* (2013.01); *F16N 2270/60* (2013.01)

(58) Field of Classification Search
CPC .... F01M 1/16; F01M 1/02; F01M 2001/0238; F01M 2001/0246; F16N 13/20; F16N 2210/04; F16N 2770/60
See application file for complete search history.

(56) References Cited

U.S. PATENT DOCUMENTS

| 4,043,304 A | 8/1977 | Stumpp et al. | |
| 2016/0215775 A1* | 7/2016 | Terada | .................. F04C 14/223 |
| 2017/0211431 A1* | 7/2017 | Hashimoto | .............. F01M 1/02 |

FOREIGN PATENT DOCUMENTS

| AT | 335229 B | 2/1977 |
| CN | 1648441 A | 8/2005 |
| CN | 103206313 A | 7/2013 |
| CN | 107060944 A | 8/2017 |
| DE | 102012109094 A1 | 3/2014 |
| JP | 2013194789 A | 9/2013 |
| JP | 2015200290 A | 11/2015 |
| KR | 2013-0056458 A | 5/2013 |
| KR | 2014-0030972 A | 3/2014 |
| KR | 20160066816 A | 6/2016 |
| WO | 2014048603 A1 | 4/2014 |

* cited by examiner

*Primary Examiner* — Jacob M Amick
(74) *Attorney, Agent, or Firm* — Fox Rothschild LLP

(57) ABSTRACT

A system for controlling a variable oil pump is provided. The system includes a variable oil pump that varies a discharge pressure of oil and an actuator that is operated to vary the discharge pressure of the oil of the variable oil pump. A controller turns the actuator on or off based a relationship between an outdoor temperature and a cooling water temperature of an engine.

19 Claims, 4 Drawing Sheets

SYSTEM AND METHOD FOR CONTROLLING VARIABLE OIL PUMP

CROSS-REFERENCE TO RELATED APPLICATION

This application claims priority to and the benefit of Korean Patent Application No. 10-2017-0165921 on Dec. 5, 2017, the entire contents of which are incorporated herein by reference.

BACKGROUND

(a) Field of the Invention

The present invention relates to a system and method for controlling a variable oil pump, and more particularly, to a system capable of reducing fuel consumption by variably adjusting discharge pressure of oil discharged from an oil pump based on operation information.

(b) Description of the Related Art

In general, a variable oil pump of a vehicle has a variation in pumping volume while an outer ring at an outer side of a rotor moves based on a pivot to maintain a predetermined oil pressure regardless of revolutions per minute (RPM) of an engine. Accordingly, a discharge amount and pressure discharged from the variable oil pump are varied, to decrease an unnecessary load of the pump in a high-speed RPM region and decrease fuel consumption.

The variable oil pump of the vehicle includes a pump housing provided with a pivot, an outer ring connected with the pivot to be rotatable about the pivot, an elastic member that provides the outer ring with restoration force, a rotor installed inside the outer ring, a plurality of veins radially installed in an outer circumference of the rotor, and a cover that seals the pump housing. In the variable oil pump of the vehicle, engine oil suctioned in a low-pressure part at a first side of an inner circumference surface of the outer ring is transmitted to a high-pressure part at a second side of the inner circumference surface of the outer ring via a compression section at a center of the inner circumference surface of the outer ring.

In the general variable oil pump, research regarding a technology of more actively controlling pressure and a discharge amount of oil discharged from the variable oil pump based on an engine RPM or an oil temperature is continuously being conducted. In the meantime, the variable oil pump may decrease fuel consumption, and decrease the amount of heating of the engine in a cold area in which an outdoor temperature is low, and thus, a warming-up time of the engine may be increased and heating performance may be degraded.

The above information disclosed in this section is merely for enhancement of understanding of the background of the invention and therefore it may contain information that does not form the prior art that is already known in this country to a person of ordinary skill in the art.

SUMMARY

The present invention provides a system and method for controlling a variable oil pump which increases the amount of heating of an engine under a condition of a low outdoor temperature, thereby decreasing a warming-up time of the engine and improving heating performance.

An exemplary embodiment of the present invention provides a system for controlling a variable oil pump that may include: a variable oil pump configured to vary a discharge pressure of oil; an actuator operated to vary the discharge pressure of the oil of the variable oil pump; and a controller configured to operate the actuator and turn on/off the actuator. In particular, the controller may be configured to execute a control logic of turning on the actuator based on an entry hysteresis line in which the actuator is turned on based on an increase in a cooling water temperature of an engine, based on an outdoor temperature, and the controller may be configured to execute a control logic of turning off the actuator based on an escape hysteresis line in which the actuator is turned off based on a decrease in the cooling water temperature of the engine, based on the outdoor temperature.

The entry hysteresis line based on an outdoor temperature may be set to be higher than the escape hysteresis line based on an outdoor temperature. In a first region in which the outdoor temperature is equal to or less than a predetermined first outdoor temperature, the entry hysteresis line and the escape hysteresis line may have predetermined values. In a second region between the first outdoor temperature and a second outdoor temperature greater than the first outdoor temperature, the entry hysteresis line and the escape hysteresis line may lower according to an increase in the outdoor temperature. In a third region in which the outdoor temperature is greater than the second outdoor temperature, the entry hysteresis line and the escape hysteresis line may regularly lower according to an increase in the outdoor temperature. A hysteresis region may be formed between the entry hysteresis line and the escape hysteresis line.

Another exemplary embodiment of the present invention provides a system for controlling a variable oil pump that may include: a variable oil pump configured to vary a discharge pressure of oil; an actuator operated to vary the discharge pressure of the oil of the variable oil pump; and a controller configured to operate the actuator and turn on/off the actuator. In particular, the controller may be configured to execute a logic of turning on or off the actuator according to an outdoor temperature and a cooling water temperature of an engine.

In a first region in which the outdoor temperature is equal to or less than a predetermined first outdoor temperature, an entry hysteresis line in which the actuator is turned on based on an increase in the cooling water temperature may be constant. In the first region in which the outdoor temperature is equal to or less than the predetermined first outdoor temperature, an escape hysteresis line in which the actuator is turned off based on a decrease in the cooling water temperature may be constant.

At any one point of the outdoor temperature, the cooling water temperature that corresponds to the escape hysteresis line may be less than the cooling water temperature that corresponds to the entry hysteresis line. In a second region between a predetermined first outdoor temperature and a second outdoor temperature greater than the first outdoor temperature, an entry hysteresis line in which the actuator may be turned on according to an increase in the cooling water temperature increases according to a decrease in the outdoor temperature.

An escape hysteresis line in which the actuator is turned off according to a decrease in the cooling water temperature may increase according to a decrease in the outdoor temperature. At one point of the outdoor temperature, the cooling water temperature that corresponds to one point of the escape hysteresis line may be less than the cooling water temperature that corresponds to one point of the entry hysteresis line. In a third region in which the outdoor temperature is equal to or less than a predetermined second outdoor temperature, an entry hysteresis line in which the actuator is turned on based on an increase in the cooling water temperature may regularly increase according to a decrease in the outdoor temperature.

An escape hysteresis line in which the actuator is turned off based on a decrease in the cooling water temperature may regularly increase according to a decrease in the outdoor temperature. At one point of the outdoor temperature, the cooling water temperature that corresponds to the escape hysteresis line may be less than the cooling water temperature that corresponds to the entry hysteresis line.

According to the exemplary embodiment of the present invention, it may be possible to turn on or off the actuator of the variable oil pump based on a cooling water temperature of an engine and an outdoor temperature, and when an outdoor temperature is low, it may be possible to delay a time point at which the actuator is turned on, thereby decreasing a warming-up time.

Further, even when an outdoor temperature is low, but a cooling water temperature is high, it may be possible to turn on the actuator of the variable oil pump and decrease a load of the engine. When an outdoor temperature is high, even when a cooling water temperature is low, it may be possible to advance a time point at which the actuator is turned on and decrease an entire load of the engine.

BRIEF DESCRIPTION OF THE DRAWINGS

The above and other objects, features and other advantages of the present invention will be more clearly understood from the following detailed description when taken in conjunction with the accompanying drawings, in which.

DESCRIPTION OF SYMBOLS

Figure 1:
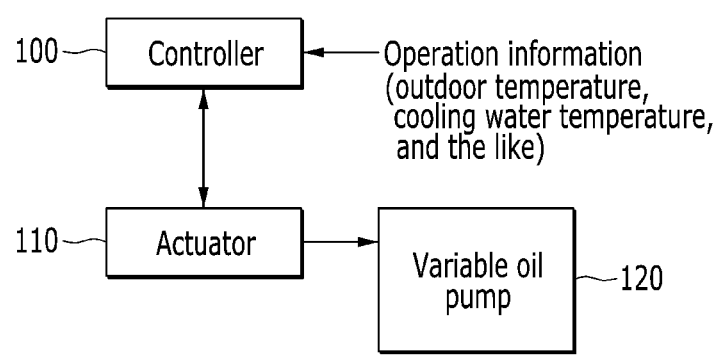
FIG. 1 is a block diagram illustrating a system for controlling a variable oil pump according to an exemplary embodiment of the present invention.

100: Controller
110: Actuator
120: Variable oil pump
200: Driving shaft
205: Outer ring
210: Inner ring
215: Vein
220: Pivot
230: Pump housing
240: Supporting part
245: Rotor
235: Elastic member
300: Entry hysteresis line
310: Escape hysteresis line

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings. However, the size and thickness of each configuration shown in the drawings are arbitrarily shown for understanding and ease of description, but the present invention is not limited thereto.

The drawings and description are to be regarded as illustrative in nature and not restrictive, and like reference numerals designate like elements throughout the specification. In the following description, dividing names of components into first, second and the like is to divide the names because the names of the components are the same as each other and an order thereof is not particularly limited.

FIG. 1 is a block diagram illustrating a system for controlling a variable oil pump according to an exemplary embodiment of the present invention. Referring to FIG. 1, a system for controlling a variable oil pump may include a controller 100, an actuator 110, and a variable oil pump 120. The controller 100 may be configured to operate the actuator and the pump.

In particular, the controller 100 may be configured to receive operation information (e.g., an outdoor temperature, a cooling water temperature, and the like detected using a sensor), and turn the actuator 110 on or off based on the received operation information. When the actuator 110 is on, a discharge pressure discharged from the variable oil pump 120 may be linearly adjusted according to an operation state. In the exemplary embodiment of the present invention, the variable oil pump 120 having a structure of FIG. 2 will be described. However, the system for controlling the variable oil pump according to the exemplary embodiment of the present invention is not limited thereto, and may be applied to all of the variable oil pumps 120 which adjust a discharge pressure by the actuator 110.

In the variable oil pump 120, when revolutions per minute (RPM) are increased, the discharge pressure is increased, and when the actuator 110 is on, the discharge pressure may be generated using a setting value that is less than a maximum value, and for example, a discharge pressure greater than a discharge pressure required by an engine may be generated. Further, when the actuator 110 is off, the variable oil pump 120 may generate an oil discharge pressure having a maximum value at a corresponding RPM. Herein, when the discharge pressure of the variable oil pump 120 is increased, consumed power of the variable oil pump 120 is increased. In other words, when the discharge pressure of the oil is increased, the amount of fuel injected of the engine is increased and an increase speed of a cooling water temperature is increased.

Figure 2:
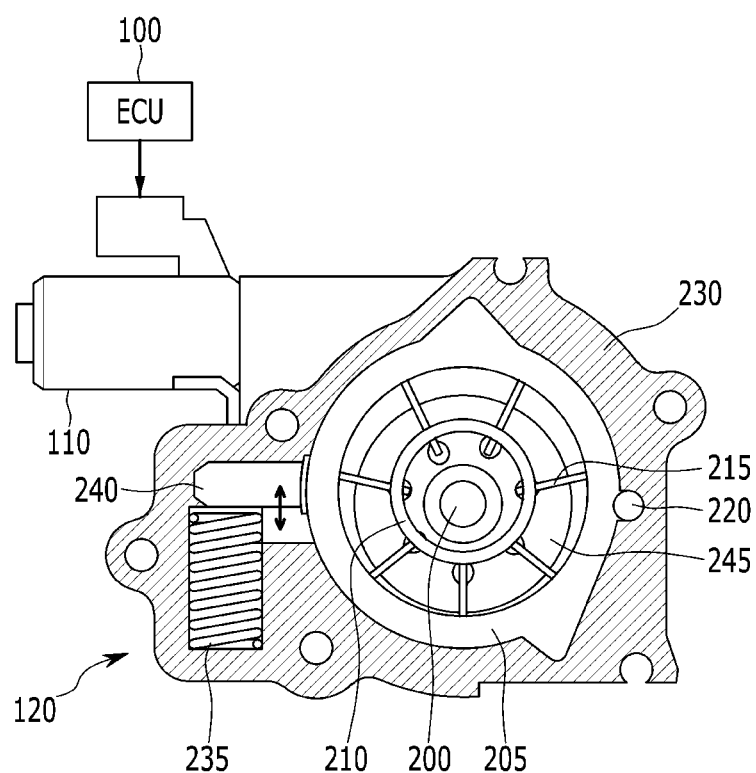
FIG. 2 is a cross-sectional view of a part of the variable oil pump according to the exemplary embodiment of the present invention.

FIG. 2 is a cross-sectional view of a part of the variable oil pump according to the exemplary embodiment of the present invention. Referring to FIG. 2, the variable oil pump 120 may include a driving shaft 200, an outer ring 205, an inner ring 210, veins 215, a pivot 220, a pump housing 230, a supporting part 240, a rotor 245, and an elastic member 235, and the actuator 110 may be fixed to an external side of the pump housing 230.

Various elastic members, for example, a coil spring, may be used as the elastic member 235, and the elastic member 235 may be disposed to elastically support the supporting part 240. Further, the controller 100 may be configured to turn the actuator 110 on or off, and the actuator 110 may linearly adjust a discharge pressure discharged from the variable oil pump 120 by linearly adjusting power pressing the supporting part 240.

The driving shaft 200 may be connected to an external power source (e.g., an output shaft of an engine), and thus, the number of revolutions of the driving shaft 200 may be changed. The outer ring 205 may be disposed to be rotatable in a clockwise direction or a counterclockwise direction based on the pivot 220 formed at one side thereof. The elastic member 235 may apply elastic force rotating the outer ring 205 in the clockwise direction to the supporting part 240, and the actuator 110 may apply elastic force rotating the outer ring 205 in the counterclockwise direction to the supporting part. Herein, when the outer ring 205 rotates in the clockwise direction, the discharge pressure is increased, and when the outer ring 205 rotates in the counterclockwise direction, the discharge pressure is decreased.

In the exemplary embodiment of the present invention, a detailed operation principle and operation structure of the variable oil pump 120 will refer to the publicly known technology, and thus, a detailed description thereof will be omitted. In the exemplary embodiment of the present invention, the controller 100 may be configured to turn the actuator 110 on or off based on a cooling water temperature of the engine and an outdoor temperature. When an outdoor temperature is low, the controller 100 may be configured to delay a time point at which the actuator 110 is turned on (e.g., delay a start of the actuator), thereby decreasing a warming-up time.

Further, even when an outdoor temperature is low, but a cooling water temperature is high, the controller 100 may be configured to turn on the actuator 110 and decrease a load of the engine. When an outdoor temperature is high, even when a cooling water temperature is low, the controller 100 may be configured to advance a time point at which the actuator 110 is turned on, thereby decreasing an entire load of the engine.

Figure 3:
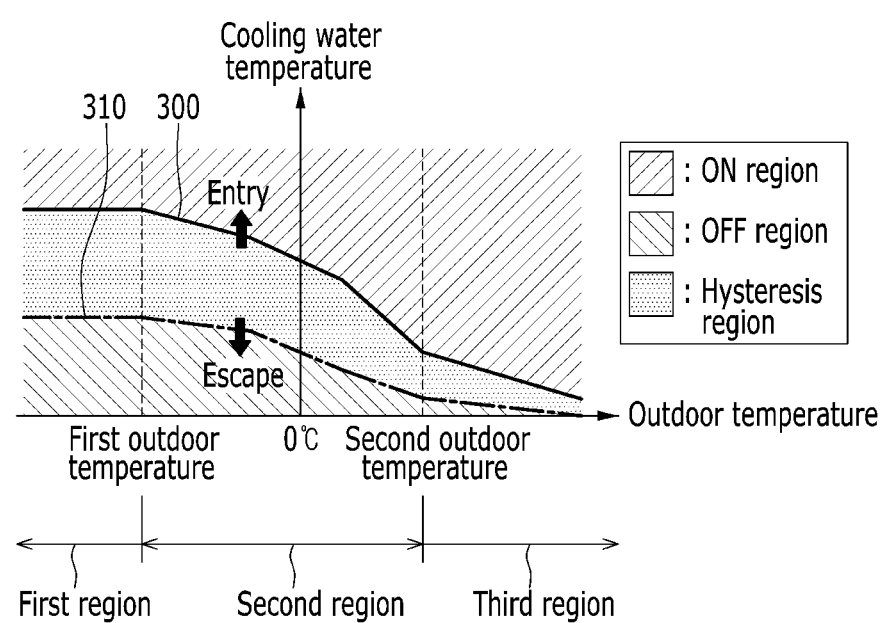
FIG. 3 is a graph illustrating a relationship between an outdoor temperature and a cooling water temperature for controlling the variable oil pump according to the exemplary embodiment of the present invention.

FIG. 3 is a graph illustrating a relationship between an outdoor temperature and a cooling water temperature for controlling the variable oil pump according to the exemplary embodiment of the present invention. Referring to FIG. 3, a horizontal axis indicates an outdoor temperature and a vertical axis indicates a cooling water temperature of the engine. In the graph, an entry hysteresis line 300 and an escape hysteresis line 310 are formed.

Particularly, an upper region of the entry hysteresis line 300 is an on region in which the actuator 110 is turned on, and a lower region of the escape hysteresis line 310 is an off region in which the actuator 110 is turned off. A region between the entry hysteresis line 300 and the escape hysteresis line 310 is a hysteresis region. For example, a state in which the cooling water temperature is 0° C. and an outdoor temperature is a first outdoor temperature, corresponds to the off region, and thus, the actuator 110 may be turned off. A state in which the cooling water temperature is gradually increased and reaches the entry hysteresis line 300, corresponds to the on region, and thus, the actuator 110 may be turned on.

However, in the state in which the cooling water temperature is decreased in the on region and reaches the escape hysteresis line 310 through the hysteresis region, corresponds to the off region, and thus, the actuator 110 may be turned off. As the outdoor temperature is increased, the cooling water temperature at which the turned-off actuator 110 is turned on decreases, and thus, the cooling water temperature at which the turned-on actuator 110 is turned off also decreases.

In other words, at any one point of the outdoor temperature, the cooling water temperature that corresponds to the escape hysteresis line 310 is less than the cooling water temperature that corresponds to the entry hysteresis line 300. In the region in which the outdoor temperature is equal to or less than the first outdoor temperature, the cooling water temperature at which the actuator 110 is turned on and the cooling water temperature at which the actuator 110 is turned off may be constantly maintained.

In a region in which the outdoor temperature is between the first outdoor temperature and a second outdoor temperature, shows the characteristic that the cooling water temperature at which the actuator 110 is turned on and the cooling water temperature at which the actuator 110 is turned off are gradually decreased based on an increase of the outdoor temperature. Further, in a region in which the outdoor temperature is equal to or greater than the second outdoor temperature, shows the characteristic that the cooling water temperature at which the actuator 110 is turned on and the cooling water temperature at which the actuator 110 is turned off are regularly decreased based on an increase of the outdoor temperature, and the escape hysteresis line 310 lowers and reaches a point at which the cooling water temperature is 0° C.

As shown in the graph of FIG. 3, when the outdoor temperature is low, the cooling water temperature at which the actuator 110 is turned on is high, and thus, a load of the engine may be increased by maintaining the off state of the actuator 110 when the cooling water temperature is low, thereby rapidly warming up the engine. Further, when the outdoor temperature is high, the cooling water temperature at which the actuator 110 is turned on is low, and thus, a load of the engine may be decreased by maintaining the actuator 110 in the on state when the cooling water temperature is high. In addition, by disposing the hysteresis region between the entry hysteresis line 300 and the escape hysteresis line 310, an operation of the actuator 110 may be controlled more stably by removing a frequent on/off operation of the actuator 110.

Figure 4:
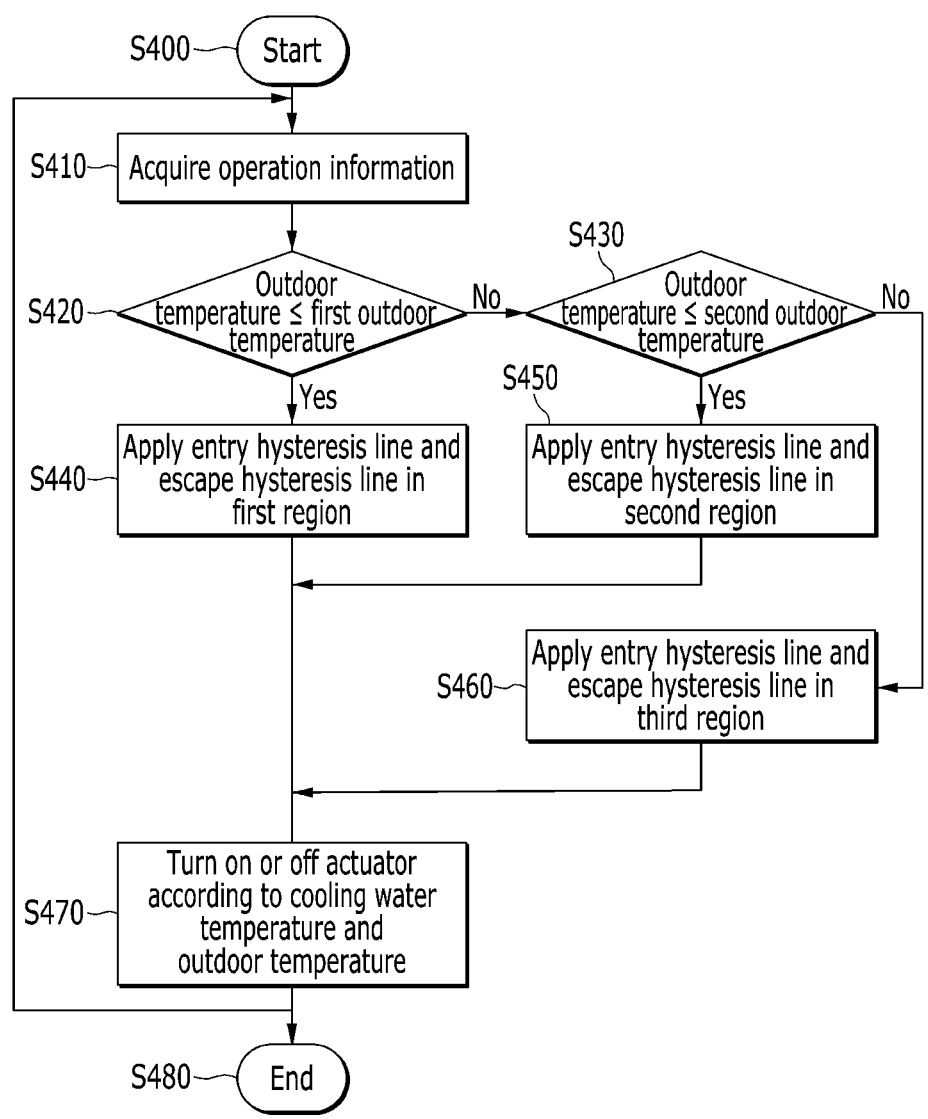
FIG. 4 is a flowchart illustrating a method of controlling a variable oil pump according to an exemplary embodiment of the present invention.

FIG. 4 is a flowchart illustrating a method of controlling a variable oil pump according to an exemplary embodiment of the present invention. Referring to FIG. 4, a control starts in operation S400. The control may start together with starting of the engine.

In operation S410, the controller 100 may be configured to acquire operation information, such as an outdoor temperature and a cooling water temperature using a plurality of sensors. Additionally, in operation S420, the controller 100 may be configured to determine whether the acquired outdoor temperature is equal to or less than a first outdoor temperature. In response to determining that the outdoor temperature is equal to or less than the first outdoor temperature, the controller 100 may be configured to load data for the entry hysteresis line 300 and the escape hysteresis line 310 corresponding to the first region of the graph of FIG. 3 in operation S440, and the controller 100 may be configured to turn the actuator 110 on or off according to the cooling water temperature and the outdoor temperature based on the loaded data in operation S470.

In a first region in which the outdoor temperature is equal to or less than the first outdoor temperature, the entry hysteresis line and the escape hysteresis line may have predetermined values. In other words, even when the outdoor temperature is low, but the cooling water temperature is equal to or greater than a predetermined value, it may be possible to sufficiently supply power to a heater core, and thus, the controller 100 may be configured to turn on the actuator 110. In response to determining that the outdoor temperature is greater than the first outdoor temperature, the controller 100 may be configured to determine whether the outdoor temperature is equal to or less than a second outdoor temperature in operation S430.

In addition, in response to determining that the outdoor temperature is equal to or less than the second outdoor temperature, the controller 100 may be configured to load data for the entry hysteresis line 300 and the escape hysteresis line 310 corresponding to the second region of the graph of FIG. 3 in operation S450, and the controller 100 may be configured to turn the actuator on or off according to the cooling water temperature and the outdoor temperature based on the loaded data in operation S470. In response to determining that the outdoor temperature is greater than the second outdoor temperature, the controller 100 may be configured to load data for the entry hysteresis line 300 and the escape hysteresis line 310 corresponding to a third region of the graph of FIG. 3 in operation S460, and the controller 100 may be configured to turn the actuator 110 on or off according to the cooling water temperature and the outdoor temperature based on the loaded data in operation S470. When the starting of the engine is off, the controller 100 may terminate the control in operation S480.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A system for controlling a variable oil pump, comprising:
   a variable oil pump configured to vary a discharge pressure of oil;
   an actuator operated to vary the discharge pressure of the oil of the variable oil pump; and
   a controller configured to operate the actuator to turn on or off,
   wherein the controller is configured to execute a control logic of turning on the actuator based on an entry hysteresis line in which the actuator is turned on according to an increase in a cooling water temperature of an engine, based on an outdoor temperature, and
   wherein the controller is configured to execute a control logic of turning off the actuator based on an escape hysteresis line in which the actuator is turned off according to a decrease in the cooling water temperature of the engine, based on the outdoor temperature.

2. The system of claim 1, wherein the entry hysteresis line according to an outdoor temperature is set to be greater than the escape hysteresis line according to an outdoor temperature.

3. The system of claim 2, wherein in a first region in which the outdoor temperature is equal to or less than a predetermined first outdoor temperature, the entry hysteresis line and the escape hysteresis line have predetermined values.

4. The system of claim 2, wherein in a second region between the first outdoor temperature and a second outdoor temperature greater than the first outdoor temperature, the entry hysteresis line and the escape hysteresis line lower according to an increase in the outdoor temperature.

5. The system of claim 2, wherein in a third region in which the outdoor temperature is greater than the second outdoor temperature, the entry hysteresis line and the escape hysteresis line lower according to an increase in the outdoor temperature.

6. The system of claim 2, wherein a hysteresis region is formed between the entry hysteresis line and the escape hysteresis line.

7. A system for controlling a variable oil pump, comprising:
   a variable oil pump configured to vary a discharge pressure of oil;
   an actuator operated to vary the discharge pressure of the oil of the variable oil pump; and
   a controller configured to turn the actuator on or off,
   wherein the controller is configured to execute a logic of turning on or off the actuator according to an outdoor temperature and a cooling water temperature of an engine
   wherein in a first region in which the outdoor temperature is equal to or less than a predetermined first outdoor temperature, an entry hysteresis line in which the actuator is turned on according to an increase in the cooling water temperature is constant.

8. The system of claim 7, wherein in the first region in which the outdoor temperature is equal to or less than the predetermined first outdoor temperature, an escape hysteresis line in which the actuator is turned off according to a decrease in the cooling water temperature is constant.

9. The system of claim 8, wherein at any one point of the outdoor temperature, the cooling water temperature corresponding to the escape hysteresis line is less than the cooling water temperature corresponding to the entry hysteresis line.

10. The system of claim 7, wherein in a second region between a predetermined first outdoor temperature and a second outdoor temperature greater than the first outdoor temperature, an entry hysteresis line in which the actuator is turned on according to an increase in the cooling water temperature rises according to a decrease in the outdoor temperature.

11. The system of claim 10, wherein an escape hysteresis line in which the actuator is turned off according to a decrease in the cooling water temperature rises according to a decrease in the outdoor temperature.

12. The system of claim 11, wherein at one point of the outdoor temperature, a cooling water temperature corresponding to one point of the escape hysteresis line is less than a cooling water temperature corresponding to at one point of the entry hysteresis line.

13. The system of claim 7, wherein in a third region in which the outdoor temperature is equal to or less than a predetermined second outdoor temperature, an entry hysteresis line in which the actuator is turned on according to an increase in the cooling water temperature rises according to a decrease in the outdoor temperature.

14. The system of claim 13, wherein an escape hysteresis line in which the actuator is turned off according to a decrease in the cooling water temperature rises according to a decrease in the outdoor temperature.

15. The system of claim 14, wherein at one point of the outdoor temperature, the cooling water temperature corresponding to the escape hysteresis line is less than the cooling water temperature corresponding to the entry hysteresis line.

16. A method for controlling a variable oil pump, comprising:
  turning, by a controller, an actuator on or off, wherein the actuator is operated to vary a discharge pressure of oil in a variable oil pump;
  executing, by the controller, a control logic of turning on the actuator based on an entry hysteresis line in which the actuator is turned on according to an increase in a cooling water temperature of an engine, based on an outdoor temperature; and
  executing, by the controller, a control logic of turning off the actuator based on an escape hysteresis line in which the actuator is turned off according to a decrease in the cooling water temperature of the engine, based on the outdoor temperature.

17. The method of claim 16, wherein the entry hysteresis line according to an outdoor temperature is set to be greater than the escape hysteresis line according to an outdoor temperature.

18. The method of claim 17, wherein in a first region in which the outdoor temperature is equal to or less than a predetermined first outdoor temperature, the entry hysteresis line and the escape hysteresis line have predetermined values.

19. The method of claim 17, wherein in a second region between the first outdoor temperature and a second outdoor temperature greater than the first outdoor temperature, the entry hysteresis line and the escape hysteresis line lower according to an increase in the outdoor temperature.

* * * * *